(12) United States Patent
Heap et al.

(10) Patent No.: US 8,801,574 B2
(45) Date of Patent: Aug. 12, 2014

(54) METHOD AND APPARATUS FOR CONTROLLING CLUTCH DEACTIVATION IN A MULTI-MODE POWERTRAIN SYSTEM

(75) Inventors: Anthony H. Heap, Ann Arbor, MI (US); Sean W. McGrogan, Ann Arbor, MI (US); Krunal P. Patel, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 183 days.

(21) Appl. No.: 13/568,045

(22) Filed: Aug. 6, 2012

(65) Prior Publication Data
US 2014/0038776 A1 Feb. 6, 2014

(51) Int. Cl.
*B60W 10/02* (2006.01)
(52) U.S. Cl.
USPC .......................................................... 477/174
(58) Field of Classification Search
USPC .................................... 477/174, 180, 166, 168
See application file for complete search history.

(56) References Cited

U.S. PATENT DOCUMENTS

| 7,258,650 | B2 * | 8/2007 | Landes | 477/168 |
| 7,645,206 | B2 | 1/2010 | Holmes et al. | |
| 8,475,329 | B2 * | 7/2013 | Sah | 477/3 |
| 2010/0179009 | A1 | 7/2010 | Wittkopp et al. | |
| 2010/0228412 | A1 * | 9/2010 | Sah | 701/22 |
| 2010/0248892 | A1 * | 9/2010 | Sah | 477/5 |
| 2014/0046556 | A1 * | 2/2014 | Lado et al. | 701/54 |

* cited by examiner

*Primary Examiner* — David D Le
*Assistant Examiner* — David J Hlavka

(57) ABSTRACT

A powertrain system includes an internal combustion engine, a multi-mode transmission having a plurality of torque machines, and a driveline. A method for deactivating a torque transfer clutch of the multi-mode transmission includes imposing prioritized clutch torque constraints to an off-going clutch. The constraints include minimum and maximum long-term desired clutch torque constraints that are superseded by minimum and maximum soft clutch torque constraints that are superseded by minimum and maximum short-term desired clutch torque constraints that are superseded by minimum and maximum hard clutch torque constraints. The off-going clutch is controlled in response to the prioritized clutch torque constraints.

18 Claims, 3 Drawing Sheets

METHOD AND APPARATUS FOR CONTROLLING CLUTCH DEACTIVATION IN A MULTI-MODE POWERTRAIN SYSTEM

TECHNICAL FIELD

This disclosure is related to multi-mode powertrain systems employing multiple torque-generative devices, and dynamic system controls associated therewith.

BACKGROUND

The statements in this section merely provide background information related to the present disclosure. Accordingly, such statements are not intended to constitute an admission of prior art.

Powertrain systems may be configured to transfer torque originating from multiple torque-generative devices through a torque transmission device to an output member that may be coupled to a driveline. Such powertrain systems include hybrid powertrain systems and extended-range electric vehicle systems. Control systems for operating such powertrain systems operate the torque-generative devices and apply torque transfer elements in the transmission to transfer torque in response to operator-commanded output torque requests, taking into account fuel economy, emissions, driveability, and other factors. Exemplary torque-generative devices include internal combustion engines and non-combustion torque machines. The non-combustion torque machines may include electric machines that are operative as motors or generators to generate a torque input to the transmission independently of a torque input from the internal combustion engine. The torque machines may transform vehicle kinetic energy transferred through the vehicle driveline to electrical energy that is storable in an electrical energy storage device in what is referred to as a regenerative operation. A control system monitors various inputs from the vehicle and the operator and provides operational control of the hybrid powertrain, including controlling transmission operating state and gear shifting, controlling the torque-generative devices, and regulating the electrical power interchange among the electrical energy storage device and the electric machines to manage outputs of the transmission, including torque and rotational speed.

Known transmission devices employ torque-transfer clutch devices to transfer torque between the engine, the torque machines and the driveline. Operation of a powertrain system includes activating and deactivating the clutches to effect operation in selected operating states.

SUMMARY

A powertrain system includes an internal combustion engine, a multi-mode transmission having a plurality of torque machines, and a driveline. A method for deactivating a torque transfer clutch of the multi-mode transmission includes imposing prioritized clutch torque constraints to an off-going clutch. The constraints include minimum and maximum long-term desired clutch torque constraints that are superseded by minimum and maximum soft clutch torque constraints that are superseded by minimum and maximum short-term desired clutch torque constraints that are superseded by minimum and maximum hard clutch torque constraints. The off-going clutch is controlled in response to the prioritized clutch torque constraints.

BRIEF DESCRIPTION OF THE DRAWINGS

One or more embodiments will now be described, by way of example, with reference to the accompanying drawings, in which:

FIGS. 3-1 through 3-4 illustrate allowable clutch torque in response to a command to deactivate a clutch, in accordance with the disclosure.

DETAILED DESCRIPTION

Figure 1:
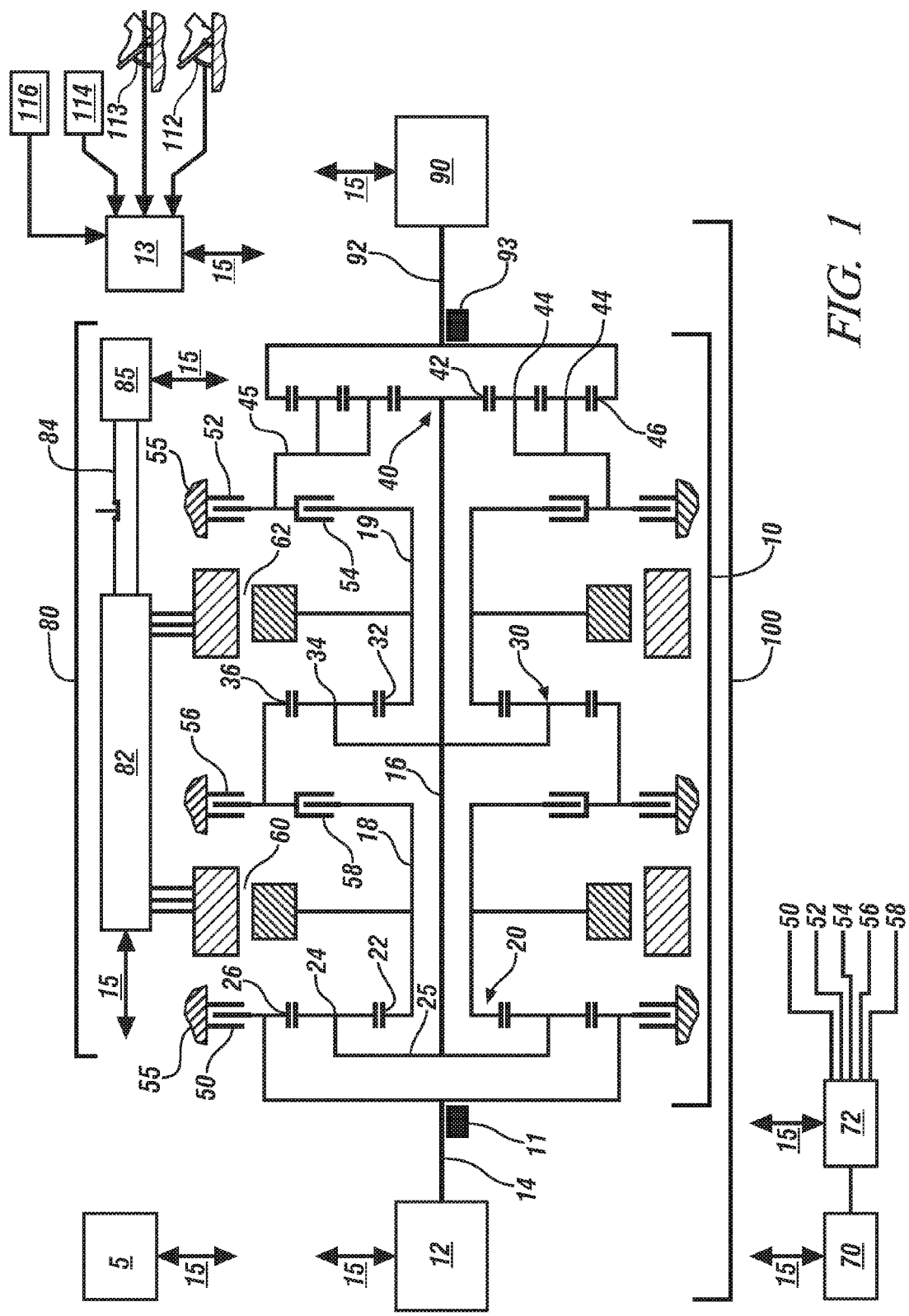
FIG. 1 illustrates a multi-mode powertrain system including an internal combustion engine, transmission, driveline, and a controller, in accordance with the disclosure.

Referring now to the drawings, wherein the showings are for the purpose of illustrating certain exemplary embodiments only and not for the purpose of limiting the same, FIG. 1 depicts a non-limiting powertrain system 100 including an internal combustion engine 12, a multi-mode transmission 10, a high-voltage electrical system 80, a driveline 90, and a controller 5. The transmission 10 mechanically couples to the engine 12 and first and second torque machines 60 and 62, respectively, and is configured to transfer torque between the engine 12, the torque machines 60, 62, and the driveline 90. As illustrated, the first and second torque machines 60, 62 are electric motor/generators.

The high-voltage electrical system 80 includes an electrical energy storage device (ESD) 85 electrically coupled to a transmission power inverter control module (TPIM) 82 via a high-voltage electrical bus 84, and is configured with suitable devices for monitoring electric power flow including devices and systems for monitoring electric current and voltage. The ESD 85 can be any suitable high-voltage electrical energy storage device, e.g., a high-voltage battery, and preferably includes a monitoring system that provides a measure of electrical power supplied to the high-voltage bus electrical 84, including voltage and electric current.

The engine 12 may be any suitable combustion device, and includes a multi-cylinder internal combustion engine selectively operative in several states to transfer torque to the transmission 10 via an input member 14, and can be either a spark-ignition or a compression-ignition engine. The engine 12 includes a crankshaft coupled to the input member 14 of the transmission 10. A rotational speed sensor 11 monitors crank angle and rotational speed of the input member 14. Power output from the engine 12, i.e., rotational speed multiplied by engine torque, can differ from the input speed and the input torque to the transmission 10 due to placement of torque-consuming components on the input member 14 between the engine 12 and the transmission 10, e.g., a torque management device. The engine 12 is configured to execute autostop and autostart operations during ongoing powertrain operation in response to operating conditions. The controller 5 is configured to control actuators of the engine 12 to control combustion parameters including controlling intake mass airflow, spark-ignition timing, injected fuel mass, fuel injection timing, EGR valve position to control flow of recirculated exhaust gases, and intake and/or exhaust valve timing and phasing on engines so equipped. Hence, engine speed can be controlled by controlling combustion parameters including airflow torque and spark induced torque. Engine speed may also be controlled by controlling reaction torque at the input member 14 by controlling motor torques of first and second torque machines 60 and 62, respectively.

The illustrated transmission 10 is a four-mode, compound-split, electro-mechanical transmission 10 that includes three planetary-gear sets 20, 30, and 40, and five engageable torque-transferring devices, i.e., clutches C1 52, C2 54, C3 56, C4 58, and C5 50. Other embodiments of the transmission are contemplated. The transmission 10 couples to first and second torque machines 60 and 62, respectively. The transmission 10 is configured to transfer torque between the engine 12, the torque machines 60, 62, and the output member 92 in response to an output torque request. The first and second torque machines 60, 62 in one embodiment are motor/generators that employ electric energy to generate and react torque. The planetary gear set 20 includes a sun gear member 22, a ring gear member 26, and planet gears 24 coupled to a carrier member 25. The carrier member 25 rotatably supports the planet gears 24 that are disposed in meshing relationship with both the sun gear member 22 and the ring gear member 26, and couples to rotatable shaft member 16. The planetary gear set 30 includes a sun gear member 32, a ring gear member 36, and planet gears 34 coupled to a carrier member 35. The planet gears 34 are disposed in meshing relationship with both the sun gear member 32 and the ring gear member 36. The carrier member 35 couples to the rotatable shaft member 16. The planetary gear set 40 includes a sun gear member 42, a ring gear member 46, and planet gears 44 coupled to a carrier member 45. As shown, there are first and second sets of planet gears 44 coupled to the carrier member 45. Thus, the planetary gear set 40 is a compound, sun gear member-pinion gear-pinion gear-ring gear member gear set. The carrier member 45 rotatably couples between clutches C1 52 and C2 54. The sun gear member 42 rotatably couples to the rotatable shaft member 16. The ring gear member 46 rotatably couples to the output member 92.

As used herein, clutches refer to torque transfer devices that can be selectively applied in response to a control signal, and may be any suitable devices including by way of example single or compound plate clutches or packs, one-way clutches, and band clutches. A hydraulic circuit 72 is configured to control clutch states of each of the clutches, with pressurized hydraulic fluid supplied by an electrically-powered hydraulic pump 70 that is operatively controlled by the controller 5. Clutches C2 54 and C4 58 are hydraulically-applied rotating friction clutches. Clutches C1 52, C3 56, and C5 50 are hydraulically-controlled brake devices that can be grounded to a transmission case 55. Each of the clutches C1 52, C2 54, C3 56, and C4 58 is hydraulically applied using pressurized hydraulic fluid supplied by the hydraulic control circuit 72 in this embodiment. The hydraulic circuit 72 is operatively controlled by the controller 5 to activate and deactivate the aforementioned clutches, provide hydraulic fluid for cooling and lubricating elements of the transmission, and provide hydraulic fluid for cooling the first and second torque machines 60 and 62. Hydraulic pressure in the hydraulic circuit 72 may be determined by measurement using pressure sensor(s), by estimation using on-board routines, or using other suitable methods.

The first and second torque machines 60 and 62 are three-phase AC motor/generator machines, each including a stator, a rotor, and a resolver. The motor stator for each of the torque machines 60, 62 is grounded to an outer portion of the transmission case 55, and includes a stator core with coiled electrical windings extending therefrom. The rotor for the first torque machine 60 is supported on a hub plate gear that mechanically attaches to sleeve shaft 18 that couples to the first planetary gear set 20. The rotor for the second torque machine 62 is fixedly attached to sleeve shaft hub 19 that mechanically attaches to the second planetary gear 30. Each of the resolvers is signally and operatively connected to the transmission power inverter control module (TPIM) 82, and each senses and monitors rotational position of the resolver rotor relative to the resolver stator, thus monitoring rotational position of respective ones of first and second torque machines 60 and 62. Additionally, the signals output from the resolvers may be used to determine rotational speeds for first and second torque machines 60 and 62.

The output member 92 of the transmission 10 is rotatably connected to the driveline 90 to provide output power to the driveline 90 that is transferred to one or a plurality of vehicle wheels via differential gearing or a transaxle or another suitable device. The output power at the output member 92 is characterized in terms of an output rotational speed and an output torque. A transmission output speed sensor 93 monitors rotational speed and rotational direction of the output member 92. Each of the vehicle wheels is preferably equipped with a sensor configured to monitor wheel speed to determine vehicle speed, and absolute and relative wheel speeds for braking control, traction control, and vehicle acceleration management.

The input torque from the engine 12 and the motor torques from the first and second torque machines 60 and 62 are generated as a result of energy conversion from fuel or electrical potential stored in the electrical energy storage device (ESD) 85. The ESD 85 is high voltage DC-coupled to the TPIM 82 via the high-voltage electrical bus 84 that preferably include a contactor switch that permits or prohibits flow of electric current between the ESD 85 and the TPIM 82. The TPIM 82 preferably includes a pair of power inverters and respective motor control modules configured to receive torque commands and control inverter states therefrom for providing motor drive or regeneration functionality to meet the motor torque commands. The power inverters include complementary three-phase power electronics devices, and each includes a plurality of insulated gate bipolar transistors for converting DC power from the ESD 85 to AC power for powering respective ones of the first and second torque machines 60 and 62, by switching at high frequencies. The insulated gate bipolar transistors form a switch mode power supply configured to receive control commands. There is a pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second torque machines 60 and 62 for operation as motors or generators via transfer conductors. The TPIM 82 transfers electrical power to and from the first and second torque machines 60 and 62 through the power inverters and respective motor control modules in response to the motor torque commands. Electrical current is transmitted across the high-voltage electrical bus 84 to and from the ESD 85 to charge and discharge the ESD 85.

The controller 5 signally and operatively links to various actuators and sensors in the powertrain system via a communications link 15 to monitor and control operation of the powertrain system, including synthesizing information and inputs, and executing routines to control actuators to meet control objectives related to fuel economy, emissions, performance, drivability, and protection of hardware, including batteries of ESD 85 and the first and second torque machines 60 and 62. The controller 5 is a subset of an overall vehicle control architecture, and provides coordinated system control of the powertrain system. The controller 5 may include a distributed control module system that includes individual control modules including a supervisory control module, an engine control module, a transmission control module, a battery pack control module, and the TPIM 82. A user interface 13 is preferably signally connected to a plurality of devices through which a vehicle operator directs and commands operation of the powertrain system. The devices preferably include an accelerator pedal 112, an operator brake pedal 113, a transmission range selector 114 (PRNDL), and a vehicle speed cruise control system 116. The transmission range selector 114 may have a discrete number of operator-selectable positions, including indicating direction of operator-intended motion of the vehicle, and thus indicating the preferred rotational direction of the output member 92 of either a forward or a reverse direction. It is appreciated that the vehicle may still move in a direction other than the indicated direction of operator-intended motion due to rollback caused by location of a vehicle, e.g., on a hill. The user interface 13 may include a single device, as shown, or alternatively may include a plurality of user interface devices directly connected to individual control modules.

The aforementioned control modules communicate with other control modules, sensors, and actuators via the communications link 15, which effects structured communication between the various control modules. The specific communication protocol is application-specific. The communications link 15 and appropriate protocols provide for robust messaging and multi-control module interfacing between the aforementioned control modules and other control modules providing functionality including e.g., antilock braking, traction control, and vehicle stability. Multiple communications buses may be used to improve communications speed and provide some level of signal redundancy and integrity, including direct links and serial peripheral interface (SPI) buses. Communication between individual control modules may also be effected using a wireless link, e.g., a short range wireless radio communications bus. Individual devices may also be directly connected.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, to monitor inputs from sensing devices and other networked control modules and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The powertrain 100 is configured to operate in one of a plurality of powertrain states, including a plurality of transmission ranges and engine states to generate and transfer torque to the driveline 90. The engine states include an ON state, an OFF state, and a fuel cutoff (FCO) state. When the engine operates in the OFF state, it is unfueled, not firing, and is not spinning. When the engine operates in the ON state it is fueled, firing, and spinning When the engine operates in the FCO state, it is spinning but is unfueled and not firing. The engine ON state may further include an all-cylinder state wherein all cylinders are fueled and firing, and a cylinder-deactivation state wherein a portion of the cylinders are fueled and firing and the remaining cylinders are unfueled and not firing. The transmission ranges include a plurality of neutral (neutral), fixed gear (Gear #), variable mode (EVT Mode #), electric vehicle (EV#) and transitional (EV Transitional Range# and Pseudo-gear #) ranges that are achieved by selectively activating the clutches C1 150, C2 152, C3 154, C4 156, and C5 158. A pseudo-gear range is a variable mode transmission range in which torque output from the transmission 10 corresponds to the input torque from the engine 12, taking into account torque losses associated with torque-consuming components on the input member 14. The pseudo-gear ranges are primarily employed as intermediate transmission ranges during shifts between EVT Mode ranges. Table 1 depicts a plurality of transmission ranges and engine states for operating the powertrain 100.

TABLE 1

| Range | Engine State | C1 | C2 | C3 | C4 | C5 |
|---|---|---|---|---|---|---|
| Neutral 1 | ON/OFF | | | | | |
| Neutral 2 | ON/OFF | | | x | | |
| Neutral 3 | ON/OFF | | | | x | |
| PseudoGear 1 | ON/OFF | x | | | | |
| PseudoGear 2 | ON/OFF | | x | | | |
| Neutral | OFF | | | | | x |
| EVT Mode 1 | ON/OFF | x | | x | | |
| EVT Mode 2 | ON/OFF | x | | | x | |
| EVT Mode 3 | ON/OFF | | x | | x | |
| EVT Mode 4 | ON/OFF | | | x | x | |
| EV Transitional State 1 | OFF | x | | | | x |
| EV Transitional State 2 | OFF | | x | | | x |
| Gear 1 | ON | x | | x | x | |
| Gear 2 | ON | x | x | | x | |
| Gear 3 | ON | | x | x | x | |
| EV1 | OFF | x | | x | | x |
| EV2 | OFF | x | | | x | x |
| EV3 | OFF | | x | | x | x |
| EV4 | OFF | | | x | x | x |
| EV Transitional State 3 | OFF | x | x | | | x |
| Neutral | ON/OFF | | | x | x | |
| PseudoGear 3 | ON/OFF | x | x | | | |
| Neutral | OFF | | | x | | x |
| Neutral | OFF | | | | x | x |

Figure 2:
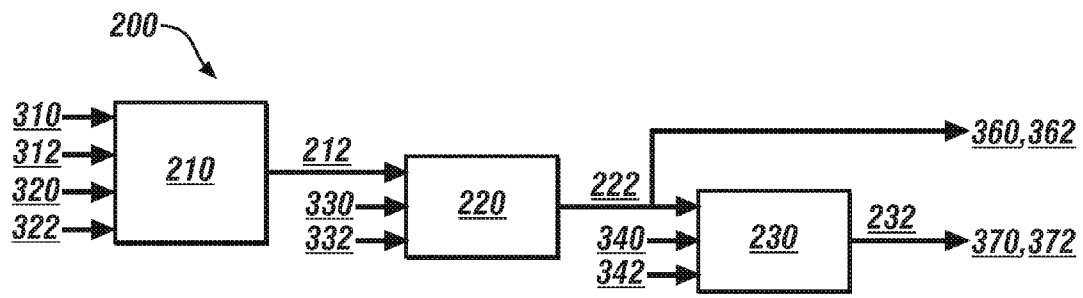
FIG. 2 illustrates a control scheme including a tiered ascending priority structure for establishing output torque constraints that are employed in controlling an off-going clutch, in accordance with the disclosure.

FIG. 2 schematically shows an embodiment of a control scheme 200 for imposing prioritized clutch torque constraints to an off-going clutch, e.g., during a transition from a first transmission range to a second transmission range. This includes a tiered ascending priority structure for establishing output torque constraints that are employed in controlling the off-going clutch, including controlling clutch torque capacity to deactivate the off-going clutch. The control scheme 200 is described with reference to an embodiment of the powertrain system 100 described with reference to FIG. 1, and may be employed on any suitable powertrain on which the concepts described herein apply. FIGS. 3-1, 3-2, 3-3, and 3-4 graphically show magnitudes of clutch torque and clutch torque constraints on the y-axis 301 in relation to time on the x-axis 303 under various circumstances as described herein.

The torque transfer clutches are employed to control operation of the transmission 10 to transfer torque between the engine 12, the first and second torque machines 60, 62, and the output member 92 in one of the ranges of Table 1, including during clutch activation and deactivation. Clutch activation includes providing clutch torque capacity to transfer torque across a clutch, preferably without slipping. Clutch torque constraints include minimum and maximum long-term desired clutch torque constraints 310 and 312, respectively, minimum and maximum soft clutch torque constraints 320 and 322, respectively, minimum and maximum short-term desired clutch torque constraints 330 and 332, respectively, and minimum and maximum hard clutch torque constraints 340 and 342, respectively. Output torque constraints include minimum and maximum long-term output torque constraints 360 and 362, respectively, and minimum and maximum short-term output torque constraints 370 and 372, respectively.

The minimum and maximum long-term desired clutch torque constraints 310, 312 are clutch torque constraints for controlling clutch torque at an end of a clutch activation or deactivation event. Thus, the minimum and maximum long-term desired clutch torque constraints 310, 312 at an end of a clutch deactivation event include a maximum long-term desired clutch torque constraint 312 that is zero.

The minimum and maximum soft clutch torque constraints 320, 322 are clutch torque constraints for controlling clutch torque during a clutch activation or deactivation event that are based upon perception of the vehicle operator, or feel. Thus, minimum and maximum soft clutch torque constraints during a deactivation event are selected to minimize adverse driveline torque disturbances that are detectable and objectionable to the vehicle operator.

The minimum and maximum short-term desired clutch torque constraints 330, 332 are clutch torque constraints for controlling clutch torque during a clutch activation or deactivation event to effect completion of the clutch activation or deactivation event within a predetermined period of time. Thus, the minimum and maximum short-term desired clutch torque constraints for controlling clutch torque during a clutch deactivation event are calibrated to effect deactivation of the clutch, i.e., zero torque capacity, within a predetermined period of time. In one embodiment the predetermined period of time to effect clutch deactivation is 0.5 seconds.

The minimum and maximum hard clutch torque constraints 340, 342 are clutch torque constraints for controlling clutch torque during a clutch activation or deactivation event to prevent a change in torque transfer that induces mechanical stress that exceeds a torque carrying capacity of one or more components of the transmission 10 or other powertrain or driveline components. The minimum and maximum hard clutch torque constraints 340, 342 account for varying changes in torque caused by different time-rate changes in torque output of different actuators of the powertrain system 100. By way of example, the internal combustion engine 12 may have a response time in the order of magnitude of 100 ms, whereas the first and second torque machines 60 and 62 may have response times in the order of magnitude of 10 ms. Thus, minimum and maximum hard clutch torque constraints 340, 342 are employed to manage time-rate changes in torque commands to the first and second torque machines 60 and 62 in relation to changes in torque command to the engine 10 to avoid undue mechanical stress in various components of the engine 12, transmission 10, and driveline 90.

The clutch torque constraints including the minimum and maximum long-term desired clutch torque constraints, minimum and maximum short-term desired clutch torque constraints, minimum and maximum soft clutch torque constraints, and minimum and maximum hard clutch torque constraints are applied in a tiered priority structure to determine output torque constraints including the minimum and maximum short-term output torque constraints 360, 362 and minimum and maximum long-term output torque constraints 370, 372, which are employed in controlling reactive torque of the off-going clutch torque.

Figures 1, 3:
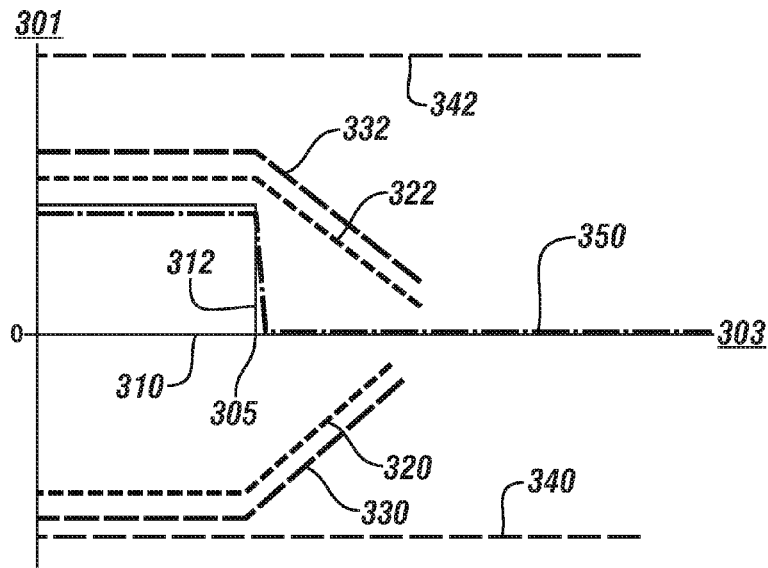
Figures 2, 3:
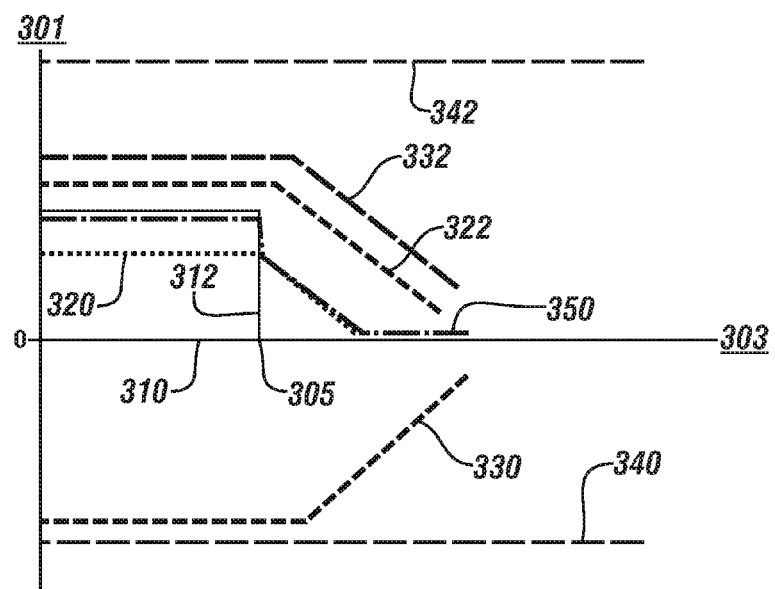
Figure 3:
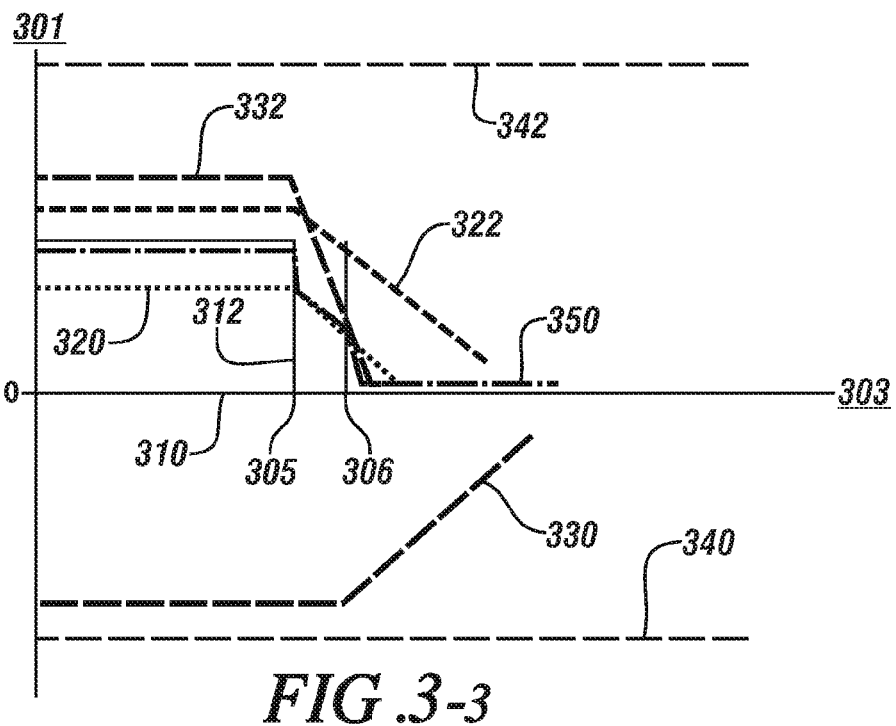
Figures 3, 4:
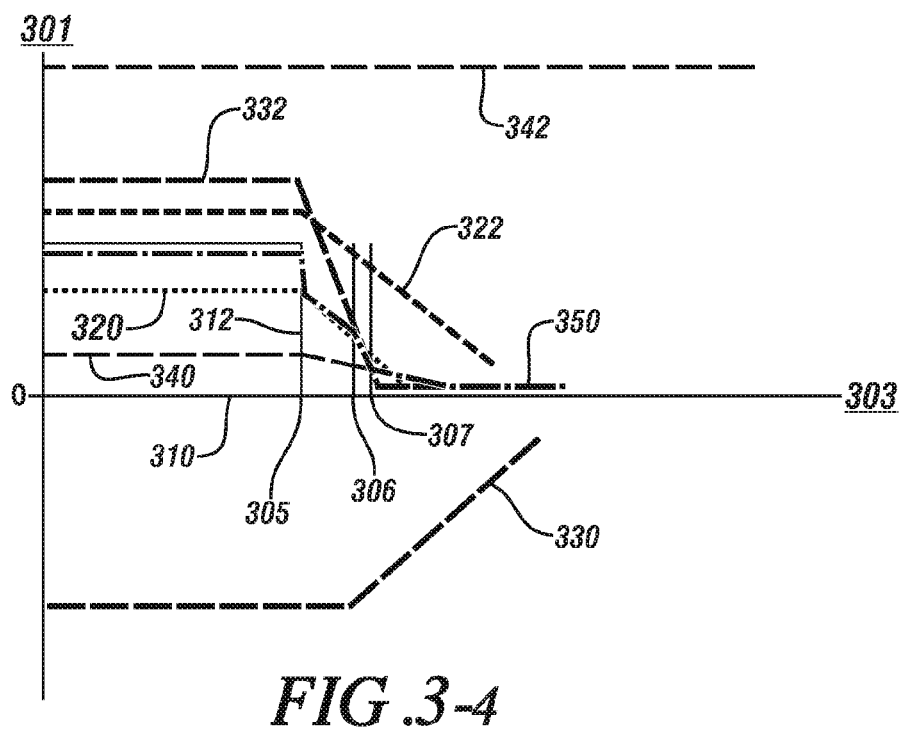

Referring again to FIG. 2 and with further reference to FIGS. 3-1, 3-2, 3-3, and 3-4, the control scheme 200 is configured as a tiered ascending priority structure that includes limit functions 210, 220, and 230 that employ various one of the aforementioned clutch torque constraints to determine minimum and maximum output torque constraints that are employed to control clutch reactive torque of the off-going clutch. The limit functions 210, 220, and 230 are applied in an ascending order. Each of the limit functions 210, 220, and 230 can introduce minimum and maximum torques, although a single one of the minimum and maximum torque values may be employed during clutch deactivation. The tiered ascending priority structure is employed to control the off-going clutch torque phase based upon its impact on output torque, i.e., what the vehicle operator senses, regardless of the source of a limiting constraint. Such operation allows for a flexible off-going torque phase that is based on its impact on output torque and driver feel, thus avoiding a clutch torque ramp rate that drives shift feel. In this manner, most shifts can be completed immediately instead of unnecessarily waiting a predetermined calibration time for each shift. Furthermore, other shifts that may require significant time (near one second) to finesse through output torque can be accommodated. FIGS. 3-1, 3-2, 3-3, and 3-4 each show a corresponding allowable clutch torque 350, which is a culmination of the time-rate imposition of the minimum and maximum torques introduced by applying the limit functions 210, 220, and 230 in ascending priority.

The first limit function 210 is employed to generate initial allowable clutch torques 212 that are defined as the minimum and maximum long-term desired clutch torque constraints 310, 312 constrained within the minimum and maximum soft clutch torque constraints 320, 322. A command to deactivate a clutch includes setting the maximum long-term desired clutch torque constraint 312 to zero, which occurs at time point 305 in each of FIGS. 3-1, 3-2, 3-3, and 3-4. The initial allowable clutch torques 212 include the maximum long-term desired clutch torque constraint 312 restricted by the minimum soft clutch torque constraint 320, which may be less than zero as shown in FIG. 3-1, or may initially be greater than zero as shown in each of FIGS. 3-2, 3-3, and 3-4.

The second limit function 220 is employed to generate intermediate allowable clutch torques 222 that are defined as the initial allowable clutch torques 212 constrained within the minimum and maximum short-term desired clutch torque constraints 330, 332. The intermediate allowable clutch torques 222 include the maximum long-term desired clutch torque constraint 312 restricted by the minimum and maximum soft clutch torque constraints 320, 322, and further restricted by the minimum and maximum short-term desired clutch torque constraints 330, 332. The minimum and maximum short-term desired clutch torque constraints 330, 332 have precedence over the previous constraints. One effect of such operation is shown in FIG. 3-3. The intermediate allowable clutch torques 222 are employed as minimum and maximum long-term output torque constraints 360, 362.

The third limit function 230 is employed to generate final allowable clutch torques 232 that are defined as the intermediate allowable clutch torques 222 constrained within the minimum and maximum hard clutch torque constraints 340, 342. The minimum and maximum hard clutch torque constraints 340, 342 have precedence over the previous constraints. One effect of such operation is shown in FIG. 3-4.

The final allowable clutch torques 232 are employed as minimum and maximum short-term output torque constraints 370, 372. Operation of the powertrain system 100, including controlling the allowable clutch torque 350 and torque commands for the first and second torque machines and the engine torque, is achieved using the minimum and maximum long-term output torque constraints 360, 362 and the minimum and maximum short-term output torque constraints 370, 372.

FIG. 3-1 graphically shows the allowable clutch torque 350 in response to a command to deactivate a clutch that includes setting the maximum long-term desired clutch torque constraint 312 to zero at time point 305. The constraints include the minimum and maximum soft clutch torque constraints 320, 322, minimum and maximum short-term desired clutch torque constraints 330, 332, and the minimum and maximum hard clutch torque constraints 340, 342, each which has ascending priority. As shown, none of the constraints imposes additional constraints upon the operation of the system, thus the constraint of the maximum long-term desired clutch torque constraint 312 being set to zero translates to and becomes the minimum long-term output torque constraint 360 and the minimum short-term output torque constraint 370, which are employed to control the allowable clutch torque 350 and the torque commands for the first and second torque machines and the engine torque.

FIG. 3-2 graphically shows the allowable clutch torque 350 in response to a command to deactivate a clutch that includes setting the maximum long-term desired clutch torque constraint 312 to zero at time point 305. The constraints include the minimum and maximum soft clutch torque constraints 320, 322, minimum and maximum short-term desired clutch torque constraints 330, 332, and the minimum and maximum hard clutch torque constraints 340, 342, each which has ascending priority. As shown, the minimum soft clutch torque constraint 320 imposes an additional constraint upon the operation of the system, thus the constraint of the maximum long-term desired clutch torque constraint 312 being set to zero is constrained by the minimum soft clutch torque constraint 322, which ramps down to zero torque over time. Neither of the minimum and maximum short-term desired clutch torque constraints 330, 332, and the minimum and maximum hard clutch torque constraints 340, 342 impose additional constraints upon the operation of the system. Thus, the constraint of the maximum long-term desired clutch torque constraint 312 is set to zero and is constrained by the minimum soft clutch torque constraint 322 at time point 305, which translates to and becomes the minimum long-term output torque constraint 360 and the minimum short-term output torque constraint 370. The result of these constraints is employed to control the allowable clutch torque 350 and the torque commands for the first and second torque machines and the engine torque.

FIG. 3-3 graphically shows the allowable clutch torque 350 in response to a command to deactivate a clutch that includes setting the maximum long-term desired clutch torque constraint 312 to zero at time point 305. The constraints include the minimum and maximum soft clutch torque constraints 320, 322, minimum and maximum short-term desired clutch torque constraints 330, 332, and the minimum and maximum hard clutch torque constraints 340, 342, each which has ascending priority. As shown, the minimum soft clutch torque constraint 320 imposes an additional constraint upon the operation of the system, thus the constraint of the maximum long-term desired clutch torque constraint 312 being set to zero is constrained by the minimum soft clutch torque constraint 322 at time point 305. In this case, the maximum short-term desired clutch torque constraint 332 imposes an additional constraint upon the operation of the system that supersedes the minimum soft clutch torque constraint 322 at time point 306. This translates to and becomes the minimum long-term output torque constraint 360 and the minimum short-term output torque constraint 370. The result of these constraints is employed to control the allowable clutch torque 350 and the torque commands for the first and second torque machines and the engine torque.

FIG. 3-4 graphically shows the allowable clutch torque 350 in response to a command to deactivate a clutch that includes setting the maximum long-term desired clutch torque constraint 312 to zero at time point 305. The constraints include the minimum and maximum soft clutch torque constraints 320, 322, minimum and maximum short-term desired clutch torque constraints 330, 332, and the minimum and maximum hard clutch torque constraints 340, 342, each which has ascending priority. As shown, the minimum soft clutch torque constraint 320 imposes an additional constraint upon the operation of the system at time point 305, thus the constraint of the maximum long-term desired clutch torque constraint 312 being set to zero is constrained by the minimum soft clutch torque constraint 322. In this case, the maximum short-term desired clutch torque constraint 332 imposes an additional constraint upon the operation of the system that supersedes the minimum soft clutch torque constraint 322 at time point 306. Furthermore, the minimum hard clutch torque constraint 340 imposes an additional constraint upon the operation of the system that supersedes the maximum short-term desired clutch torque constraint 332 at time point 307. This translates to and becomes the minimum long-term output torque constraint 360 and the minimum short-term output torque constraint 370, and the result is employed to control the allowable clutch torque 350 and the torque commands for the first and second torque machines and the engine torque.

Thus, when implemented, the control scheme 200 permits controlling an off-going clutch torque ramp rate by employing output torque as a torque actuator via the first and second torque machines 60 and 62 to complete a shift by comprehending the effect of that ramp rate on output torque. For the majority of shifts, there is no effect on output torque, and the off-going torque phase can happen almost instantaneously. For shifts where output torque can be finessed to offload the off-going clutch, including waiting for changes in torque output of a slower actuator such as the engine before offloading the clutch.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for deactivating a torque transfer clutch of a multi-mode transmission, comprising:
imposing prioritized clutch torque constraints to an off-going clutch, said constraints comprising minimum and maximum long-term desired clutch torque constraints superseded by minimum and maximum soft clutch torque constraints superseded by minimum and maximum short-term desired clutch torque constraints superseded by minimum and maximum hard clutch torque constraints; and controlling deactivation of the off-going clutch in response to said prioritized clutch torque constraints.

2. The method of claim 1, wherein imposing the prioritized clutch torque constraints to the off-going clutch comprising minimum and maximum long-term desired clutch torque constraints comprises imposing a maximum long-term desired clutch torque constraint equal to zero torque.

3. The method of claim 1, wherein imposing the prioritized clutch torque constraints to the off-going clutch comprising minimum and maximum soft clutch torque constraints comprises imposing minimum and maximum clutch torque constraints based upon output torque perception of a vehicle operator.

4. The method of claim 3, wherein imposing minimum and maximum clutch torque constraints based upon the output torque perception of the vehicle operator comprises imposing clutch torque constraints that minimize adverse driveline torque disturbances that are detectable and objectionable to the vehicle operator.

5. The method of claim 1, wherein imposing the prioritized clutch torque constraints to the off-going clutch comprising minimum and maximum short-term desired clutch torque constraints comprises imposing minimum and maximum clutch torque constraints for controlling clutch torque during clutch deactivation that effects completion of the clutch deactivation within a predetermined period of time.

6. The method of claim 5, wherein imposing minimum and maximum clutch torque constraints for controlling clutch torque during clutch deactivation effects completion of the clutch deactivation within a time period of 0.5 seconds.

7. The method of claim 1, wherein imposing the prioritized clutch torque constraints to the off-going clutch comprising minimum and maximum hard clutch torque constraints comprises imposing minimum and maximum clutch torque constraints that prevent a change in torque transfer that induces mechanical stress that exceeds a torque carrying capacity of a component of the transmission.

8. The method of claim 1, wherein imposing the prioritized clutch torque constraints to the off-going clutch comprising minimum and maximum soft clutch torque constraints comprises imposing a maximum clutch torque constraint based upon output torque perception of a vehicle operator.

9. The method of claim 1, wherein imposing the prioritized clutch torque constraints to the off-going clutch comprising minimum and maximum short-term desired clutch torque constraints comprises imposing a maximum clutch torque constraint for controlling clutch torque during clutch deactivation that effects completion of the clutch deactivation within a predetermined period of time.

10. The method of claim 1, wherein imposing the prioritized clutch torque constraints to the off-going clutch comprising minimum and maximum hard clutch torque constraints comprises imposing a clutch torque constraint that prevents a change in torque transfer that induces mechanical stress that exceeds a torque carrying capacity of a component of the transmission.

11. A method for controlling deactivation of a torque transfer clutch of a multi-mode transmission configured to transfer torque among an engine, torque machines, and a driveline, the method comprising:

determining clutch torque constraints including minimum and maximum long-term desired clutch torque constraints, minimum and maximum soft clutch torque constraints, minimum and maximum short-term desired clutch torque constraints, and minimum and maximum hard clutch torque constraints; and employing a tiered priority structure to control clutch torque to deactivate an off-going clutch, wherein said clutch torque is controlled in response to the minimum and maximum long-term desired clutch torque constraints superseded by the minimum and maximum soft clutch torque constraints superseded by the minimum and maximum short-term desired clutch torque constraints superseded by the minimum and maximum hard clutch torque constraints.

12. The method of claim 11, wherein determining clutch torque constraints including minimum and maximum long-term desired clutch torque constraints comprise determining a maximum long-term desired clutch torque constraint equal to zero torque.

13. The method of claim 11, wherein determining clutch torque constraints including minimum and maximum soft clutch torque constraints comprise determining clutch torque constraints based upon an output torque perception of a vehicle operator.

14. The method of claim 13, wherein determining clutch torque constraints based upon the output torque perception of the vehicle operator comprise determining clutch torque constraints that minimize adverse driveline torque disturbances that are detectable and objectionable to the vehicle operator.

15. The method of claim 11, wherein determining clutch torque constraints including minimum and maximum short-term desired clutch torque constraints comprises determining clutch torque constraints for controlling clutch torque during clutch deactivation that effects completion of the clutch deactivation within a predetermined period of time.

16. The method of claim 15, wherein controlling clutch torque during clutch deactivation that effects completion of the clutch deactivation within a predetermined period of time comprises controlling clutch torque that effects clutch deactivation within a time period of 0.5 seconds.

17. The method of claim 11, wherein identifying clutch torque constraints including minimum and maximum hard clutch torque constraints comprises determining clutch torque constraints for controlling clutch torque during clutch deactivation that prevent a change in torque transfer that induces mechanical stress that exceeds a torque carrying capacity of a component of the transmission.

18. The method of claim 11, wherein employing the tiered priority structure to control clutch torque to deactivate the off-going clutch comprises using a plurality of limit functions configured to employ the clutch torque constraints to determine the minimum and maximum output torque constraints to control a clutch reactive torque of the off-going clutch.

* * * * *